United States Patent [19]

Tahara

[11] Patent Number: 4,876,933

[45] Date of Patent: Oct. 31, 1989

[54] SLITTER HOLDER HAVING CLAMPING MECHANISM FOR SLITTER BLADE SUPPORT ROD

[75] Inventor: Yoshinori Tahara, Numazu, Japan

[73] Assignee: Meisan Co., Ltd., Fuji, Japan

[21] Appl. No.: 171,668

[22] Filed: Mar. 22, 1988

[30] Foreign Application Priority Data

Jun. 12, 1987 [JP] Japan ................................ 62-146496

[51] Int. Cl.4 .......................... B23D 19/04; B26D 5/04

[52] U.S. Cl. ........................................ 83/482; 83/502; 83/503; 83/588

[58] Field of Search .......................... 83/482, 500-508, 83/495, 588, 590, 879, 881, 886

[56] References Cited

U.S. PATENT DOCUMENTS

| | | | |
|---|---|---|---|
| 2,997,906 | 8/1961 | Burk et al. | 83/506 |
| 3,892,156 | 7/1975 | Johnstone | 83/482 X |
| 4,257,299 | 3/1981 | Aykut | 83/482 |
| 4,434,695 | 3/1984 | Wingen | 83/482 |
| 4,474,096 | 10/1984 | Muller | 83/482 |

*Primary Examiner*—Frank T. Yost
*Assistant Examiner*—Hien H. Phan
*Attorney, Agent, or Firm*—Fleit, Jacobson, Cohn, Price, Holman & Stern

[57] ABSTRACT

A slitter holder has a slitter blade support rod that can be moved relative to a stationary position. The slitter holder comprises a moving mechanism for moving the slitter blade support rod relative to the stationary portion between a slitter blade operation position and a slitter blade rest position, and a clamping mechanism for clamping the slitter blade support rod to the stationary portion when the slitter blade operation position.

4 Claims, 4 Drawing Sheets

SLITTER HOLDER HAVING CLAMPING MECHANISM FOR SLITTER BLADE SUPPORT ROD

BACKGROUND OF THE INVENTION

1. Field of the Invention

The present invention relates to a slitter for paper making. More specifically, the invention relates to a slitter holder having a slitter blade support rod.

2. Description of the Prior Art

In the slitter of this type, in general, the lower blade is secured in the axial direction and the upper blade is brought into lap-contact with the lower blade via a spring to slit paper or any other sheet-like materials. When the slitter is not in operation, the upper blade is separated away from the lower blade and is located at an upper side position with respect to the lower blade. When the slitter is in operation, the upper blade is moved relative to the lower blade and is brought into lap-contact therewith. A slitter holder that is capable of reliably controlling the movement of the upper blade relative to the lower blade has already been proposed as disclosed, for example, in Japanese Utility Model Publication No. 17394/1984 that was filed by the applicant of the present invention. Such a conventional slitter holder is shown in the accompanying FIG. 3.

With reference to a partial section view of FIG. 3, the conventional slitter holder is provided with a fixed mounting fitting 1 that is fixed to a support frame (not diagramed) which holds the slitter holder. The fixed mounting fitting 1 is a hollow member whose upper and lower ends are closed by an upper cover 2 and a lower cover 3 thereby to define a cylinder space 4 therein. An upper blade support rod 5 is provided so as to penetrate through the cylinder space 4. At the lower end of the upper blade support rod 5 is provided an annular member 7 which forms another cylinder space 6. Both ends of the annular member 7 is closed by end plates 8 and 9. In the cylinder space 6 is provided a piston 10 which has a shaft 11 that extends to the outside of the cylinder space 6. To the other end of the shaft 11 is detachably attached a knife holder 20 to which a dish-type knife 24 is fitted by a compression spring 25. The thus fitted dish-type knife 24 is rotated about the shaft 11 by an upper blade drive device (not shown).

To the upper blade support rod 5 is fastened a piston 19 that moves in the cylinder space 4. The piston 19 is upwardly urged at all times by an urging spring 41. The upper blade support rod 5 moves up and down accompanying the piston 19 that moves up and down in the cylinder space 4. Further, the piston 10 that moves in the cylinder space 6 is leftwardly urged in FIG. 3 at all times by an urging spring 44. An adjust screw 45 screwed into the end plate 9 limits the rightward movement of the piston 10 and, hence, limits the movement with respect to the upper blade 24 and the lower blade 40. Drive systems for the pistons 19 and 10 will now be described. The upper end of the cylinder space 4 is connected to a source of air pressure through a passage 2B formed in the upper cover 2, air conduit 46, first delay valve 47 and air conduit 48, and the left end of the cylinder space 6 is connected to the source of air pressure via a passage 7A formed in the annular member 7, passage 5A formed in the rod 5, air conduit 49, second delay valve 50 and air conduit 51. When not energized, the first delay valve 47 and the second delay valve 50 permit the air conduit 46 and 49 to open to the atmosphere, respectively. Therefore, the pistons 19 and 10 are urged upwardly and leftwardly, respectively, by the force of the urging springs 41 and 44. Under this condition, the upper blade 24 is separated away from the lower blade 40 as shown. In operating the slitter, if now the first and second delay valves 47 and 50 are energized, their conditions are switched so that the air conduits 46 and 49 are communicated with the source of air pressure via the air conduits 48 and 51, respectively. The air feeding rate of the first delay valve 47 has been set to be greater by a predetermined value than the air feeding rate of the second delay valve 50. Therefore, the pneumatic pressure is, first, applied to the cylinder space 4 so that the piston 19 moves downwards against the force of the urging spring 41. Namely, the upper blade 24 moves downwards and, then, the pneumatic pressure is applied to the cylinder space 6 whereby the piston 10 moves .toward the right against the force of the urging spring 44. The upper blade 24, the,, moves toward the right and, accordingly, the upper blade 24 comes into engagement with the lower blade 40 by a lapping amount determined by the nut 42. To release the engagement between the upper blade 24 and the lower blade 40, the first delay valve 47 and the second delay valve 50 should be de-energized to change over their conditions. At this moment, the air conduits 46 and 49 are opened to the atmosphere, and the pneumatic pressures in the cylinder spaces 4 and 6 are released to the open air. In this case, since the air release rate of the first delay valve 47 has been set to be greater than the air release rate of the second delay valve 50, the piston, first, starts to return toward the left and after the upper blade 24 is separated from the lower blade 40, the piston returns upwards.

According to the conventional slitter holder mentioned above, the upper blade moves downwards and then moves sideways being controlled reliably. Therefore, the upper blade and the lower blade are brought into lap-contact at all times; i.e., the upper blade and the lower blade do not come into collision with one another and are not broken. With the above-mentioned conventional slitter holder, however, a through hole 31 is formed in the lower cover 3 through which the upper blade support rod 5 penetrates and slides, and a dust seal 3A made of rubber is simply provided along the inner circumference of the through hole 31. A slight gap exists between the inner circumferential wall of the through hole 31 and the outer circumferential wall of the upper blade support rod 5 which, at this position, is supported by the tip of the dust seal 3A made of rubber. Therefore, the upper blade support rod 5 is not reliably held at the position of the through hole 31 and rattles. When the slitter is in operation, therefore, the upper blade support rod 5 tends to vibrate in the right and left directions to adversely affect the operation of the slitter. Vibration of the upper blade support rod 5 increases with the increase in the operation speed of the slitter, and the slitter operation is adversely affected more seriously.

An object of the present invention is to provide a slitter holder which is capable of eliminating the aforementioned problem inherent in the conventional slitter holder.

SUMMARY OF THE INVENTION

According to the present invention, there is provided a slitter holder having a slitter blade support rod that can be moved relative to a stationary portion, the slitter holder comprising a moving mechanism for moving the slitter blade support rod relative to the stationary portion between a slitter blade operation position and a slitter blade rest position, and a clamping mechanism for clamping the slitter blade support rod to the stationary portion when the slitter blade support rod is moved to the slitter blade operation position.

The present invention will now be described in further detail with regard to preferred embodiments as illustrated in the accompanying drawing.

DESCRIPTION OF THE PREFERRED EMBODIMENTS

Figure 1:
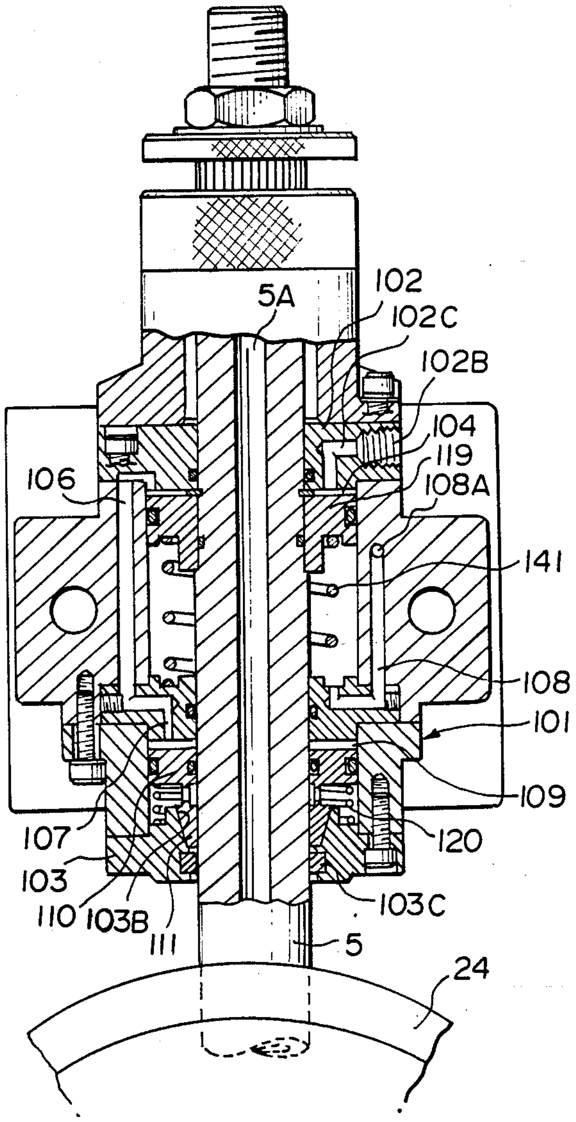
FIG. 1 is a partial section view illustrating a portion for driving a slitter blade support rod in a slitter holder according to an embodiment of the present invention.
Figure 2:
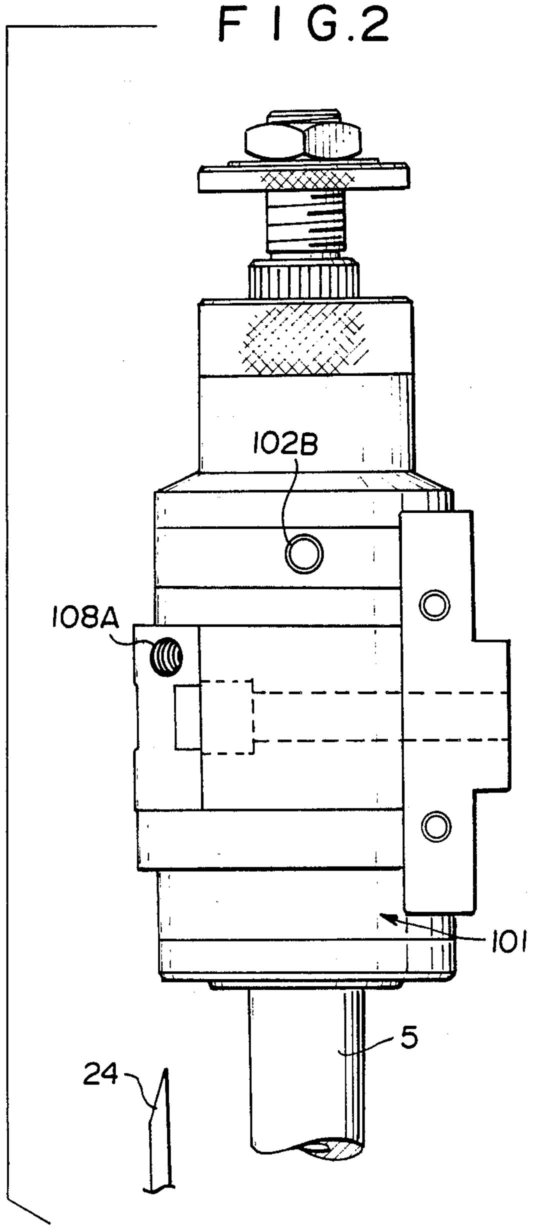
FIG. 2 is a side view of the drive portion of FIG. 1.
Figure 3:
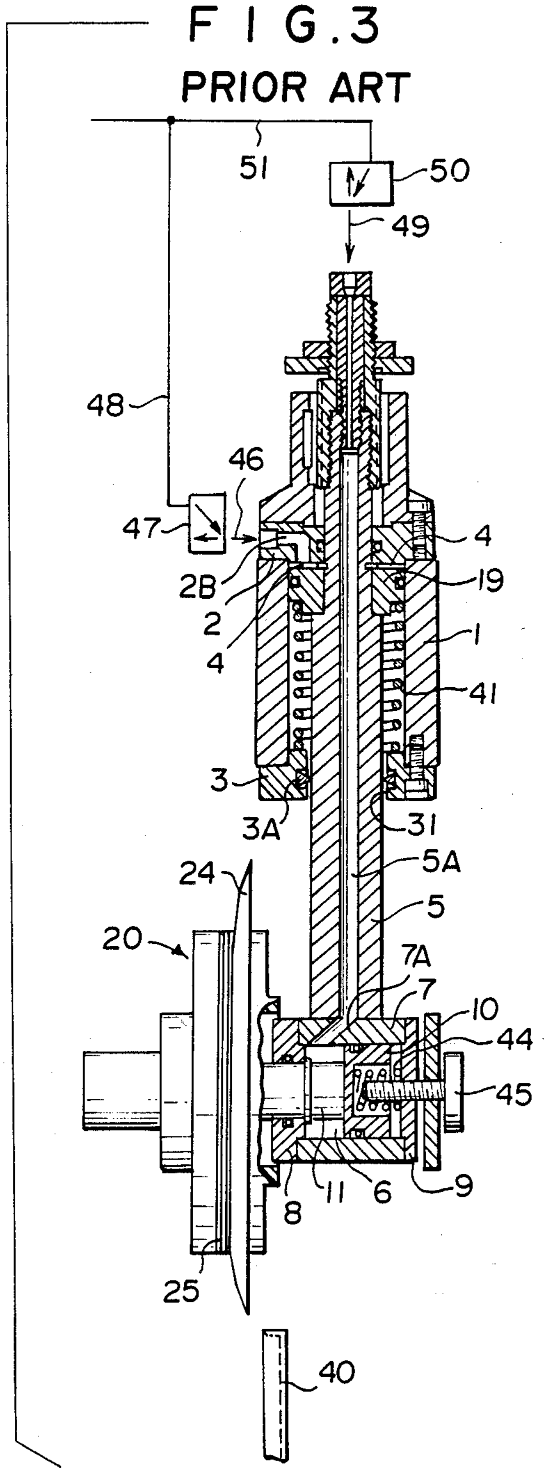
F I G. 3 PRIOR ART
FIG. 3 is a partial section view showing a conventional slitter holder.

Referring now to FIGS. 1 and 2, there is shown a slitter holder according to an embodiment of the present invention for holding the upper blade of a slitter. In FIGS. 1 and 2, the same portions as those of the conventional slitter holder of FIG. 3 are denoted by the same reference numerals or are omitted.

As best shown in FIG. 1, a first cylinder portion 104 through which the slitter blade support rod 5 penetrates is formed in an upper portion of a stationary portion 101 which is a fixed fitting for mounting the slitter holder. Similarly, a second cylinder portion 109 through which the slitter blade support rod 5 penetrates is formed in a lower portion of the stationary portion 101. In the first cylinder portion 104 is provided a first piston 119 which is fastened to the slitter blade support rod 5. In the first cylinder portion 104 is further provided an urging spring 141 which surrounds the slitter blade support rod 5 between the first piston 119 and the bottom of the first cylinder portion 104. In case the supply of the compressed air is interrupted due to power failure or the like, the slitter blade support rod 5 may descend due to gravity and the upper blade 24 may descend. In order to eliminate such a probability, the urging spring 141 upwardly urges the slitter blade support rod 5 at all times so that it will not descend due to gravity. Further, in the second cylinder portion 109 is provided a second piston 110 permitting the slitter blade support rod 5 to penetrate and slide therethrough. The second piston 110 is upwardly urged at all times by an urging spring 120 which is provided to surround the slitter blade support rod 5 between the second piston 110 and the lower cover 103. A clamp member 111 which downwardly extends is formed at the lower end of the second piston 110 as a unitary structure. The clamp member 111 is of an annular shape having such an inner peripheral size that permits the slitter blade support rod 5 to penetrate and slide therethrough. Further, the clamp member 111 has slits formed at four places in the circumference thereof, and can be resiliently squeezed inwardly or can be expanded outwardly. The outer periphery of the clamp member 111 is tapered. In the lower cover 103 is formed an opening which permits the slitter blade support rod 5 to pass through, and on the inner peripheral wall of the opening is formed a tapered portion 103B that serves as a clamp action member as will be described later. A dust seal 103C made of rubber is provided near the outlet of opening for the slitter blade support rod 5.

A compressed air introduction port 102B is formed in the upper cover 102, and a compressed air passage 102C is provided to be communicated with the compressed air introduction port 102B, the compressed air passage 102C being further communicated with an upper portion of the first cylinder portion 104. In the outer peripheral wall of the stationary portion 101 is formed a compressed air passage 106 that makes the upper portion of the first cylinder portion 104 communicated with the upper portion of the second cylinder portion 109. In the compressed air passage 106 is provided a throttle passage 107 to exhibit a function that will be described later. In the outer peripheral wall of the stationary portion 101 are further formed a compressed air introduction port 108A and a compressed air passage 108 that is communicated with the compressed air introduction port 108A and with the lower portion of the first cylinder portion 104.

Operation of the thus constructed slitter holder will now be described. Under the condition shown in FIG. 1, the first piston 119 is located at the uppermost portion of the first cylinder portion 104 and the slitter blade support rod 5 is at the slitter blade rest position. Under such a condition, if the compressed air is supplied from a suitable source of the compressed air to the compressed air passage 102C via compressed air introduction port 102B, and is sent to the upper portion of the first cylinder portion 104, the first piston 119 moves downwards overcoming the upwardly directed force of the urging spring 141 due to the action of the compressed air. This is because, the compressed air sent to the upper portion of the first cylinder portion 104 via the compressed air passage 102 is further sent to the upper portion of the second cylinder portion 109 via compressed air passage 106. Here, however, since the compressed air passage 106 is provided with a throttle passage 107, the pressure does not readily act upon the second piston 110 due to the socalled throttle valve action of the throttle passage 107 and the upwardly directed resilient force of the urging spring 120. Therefore, the second piston 110 remains located at the uppermost portion in the second cylinder portion 109 as shown in FIG. 1. When the second piston 110 is located at such a position, the clamp member 111 is not inwardly squeezed and is at a liberated position. When the clamp member 111 is at the liberated position, the slitter blade support rod 5 is allowed to freely move penetrating through the second piston 110. When the slitter blade support rod 5 is descended and the upper blade 24 moves to the slitter blade operation position at which the upper blade 24 comes into lap-engagement with the lower blade 40, the second piston 110 moves downwards overcoming the upwardly directed force of the urging spring 120 due to the action of the compressed air that is sent to the upper portion of the second cylinder portion 109 via the throttle passage 107 in the compressed air passage 106. Then, the clamp member 111 acquires a clamp position being gradually squeezed inwardly due to the cam function produced by the tapered portion along the periphery at the tip of the clamp member 111 and the tapered portion 103B along the inner peripheral wall in the opening of the lower cover 103, and the slitter blade support rod 5 is firmly held at that position by the clamp member 111.

To return the slitter blade support rod 5 from the slitter blade operation position to the initial slitter blade rest position, the compressed air is released from the compressed air introduction port 102B and, at the same time, the compressed air is introduced from the compressed air introduction port 108A so that the compressed air is sent to the lower portion of the first cylinder portion 104 via the compressed air passage 108. Then, the first piston 119 is moved upwardly by the action of the compressed air and the force of the urging spring 141, and the slitter blade support rod 5 is returned to the initial slitter blade rest position. When the slitter blade support rod 5 is started to move upwards, the clamp member 111 is holding the slitter blade support rod 5. Therefore, the clamp member 111 is moved upwards together with a second piston 110 accompanying the upward return motion of the slitter blade support rod 5. As the clamp member 111 moves upwards, the cam action is weakened in the tapered portion 103B in the lower cover 103, and whereby the clamp member 111 gradually expands outwardly due to its resiliency and returns to the liberated position. Thereafter, the second piston 110 is returned to the uppermost portion of the second cylinder portion 109 owing to the upwardly directed force of the urging spring 120. Thus, the urging spring 120 exhibits a function to hold the second piston 110 at an upper position so that the clamp member 111 acquires the clamp position in a delayed manner at a moment when the slitter blade support rod 5 is started to move to the slitter blade operation position, and further exhibits a function to hold the second piston 110 at the upper position in the second cylinder portion 109 when the slitter blade support rod 5 is at the slitter blade rest position.

Figure 4:
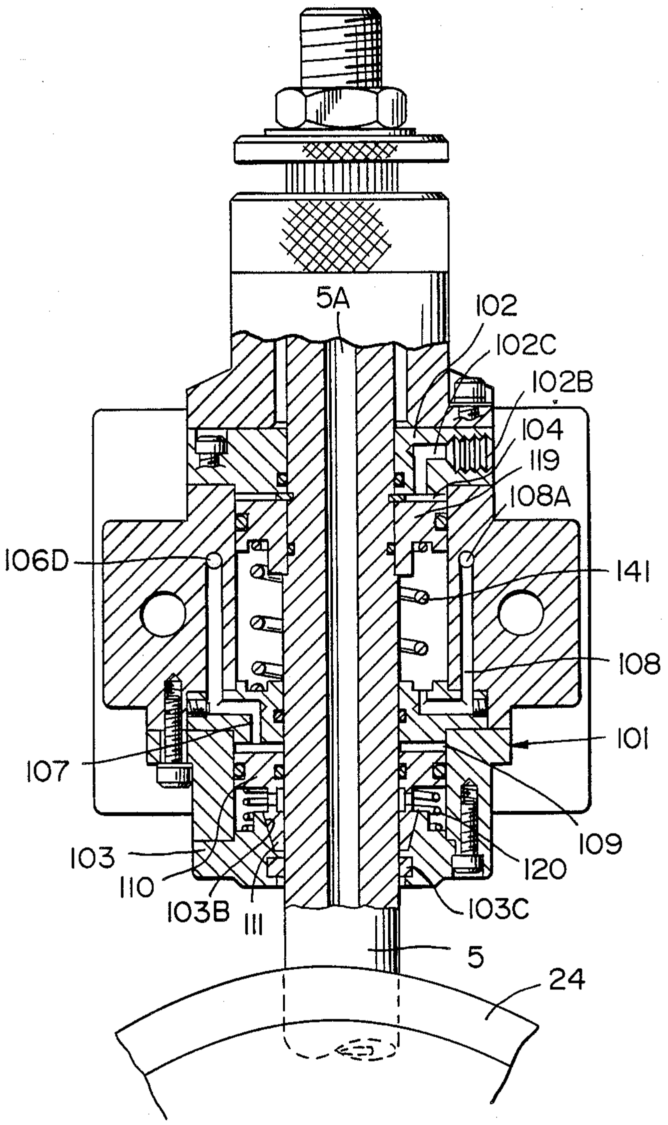
FIG. 4 is a partial section view illustrating a portion for driving a slitter blade support rod in a slitter holder according to an alternate embodiment of the present invention.

In the aforementioned embodiment, the compressed air is supplied to the upper portion of the first cylinder portion 104 and to the second cylinder portion 109 through the common compressed air introduction port 102B, and the deviation in the timing of downward movements of the first piston 119 and the second piston 110 is controlled relying upon the throttle valve action of the throttle passage 107 and the upwardly directed force of the urging spring 120. The present invention, however, is in no way limited to such a control system only. For instance, as shown in FIG. 4, the compressed air may be supplied to the upper portion of the first cylinder portion 104 and to the second cylinder portion 109 via separate compressed air introduction ports 102B and 106D, and the timing for downwardly moving the first piston 119 and the timing for downwardly moving the second piston 110 may be controlled by suitably deviating the timing for supplying the compressed air into the compressed air introduction ports 102B and 106D. Further, the fluid for driving the pistons need not be limited to the compressed air, but may be any other suitable fluid or may be substituted by any other means.

The aforementioned embodiment has dealt with the case where the present invention was adapted to the slitter holder that holds the upper blade. In practice, however, the present invention can further be adapted to the slitter holder that holds the lower blade and to any other like apparatus.

The slitter holder of the present invention has a clamping mechanism which reliably clamps the slitter blade support rod to the stationary portion when the slitter blade support rod is at the slitter blade operation position. When the slitter is in operation, therefore, the slitter blade support rod does not vibrate and favorable slitter operation is carried out at all times. Therefore, the slitter holder of the present invention can be effectively adapted to a highspeed slitter apparatus in which the slitter blade support rod tends to vibrate.

What is claimed is:

1. A slitter holder having a slitter blade support rod that can be moved relative to a stationary position, said slitter holder comprising:

a moving mechanism for moving said slitter blade support rod relative to said stationary portion between a slitter blade operation position and a slitter blade rest position; and a clamping mechanism for clamping the slitter blade support rod to said stationary portion when said slitter blade support rod is moved to said slitter blade operation position;

said moving mechanism including:

a first cylinder portion which is formed in said stationary portion and in which said slitter blade support rod is inserted;

a first piston which moves in said first cylinder portion and which is secured to said slitter blade support rod; and a first compressed air control means which controls the supply of the compressed air to said first cylinder portion in order to control the movement of said slitter blade support rod; and said clamping mechanism including:

a second cylinder portion which is formed in said stationary portion and in which said slitter blade support rod is inserted;

a second piston which moves in said second cylinder portion so that said slitter blade support rod slides;

a clamp member which moves together with said second piston to acquire a liberated position where the slitter blade support rod is liberated and to acquire a clamp position where the slitter blade support rod is clamped;

a clamp action member which is provided on said stationary portion and acts upon said clamp member so that said clamp member acquires said clamp position; and a second compressed air control means which controls the supply of the compressed air to the second cylinder portion and which, after the slitter blade support rod has moved to said slitter blade operation position, moves said second piston so that said clamp member is caused by said clamp action member to acquire said clamp position.

2. A slitter holder according to claim 1, wherein said first compressed air control means and said second compressed air control means have a common compressed air introduction port, and the compressed air is supplied to said first cylinder portion and to said second cylinder portion being controlled by a throttle means provided in a compressed air introduction passage.

3. A slitter holder according to claim 1, wherein said first compressed air control means and said second compressed air control means have separate compressed air introduction ports, and the compressed air is supplied into said first cylinder portion and said second cylinder portion by controlling the timing for supplying the air into the compressed air introduction ports.

4. A slitter holder according to claim 1, wherein said first compressed air control means and said second compressed air control means have separate compressed air introduction means for supplying compressed air, and the compressed air is supplied into said first cylinder portion and said second cylinder portion by controlling the timing for supplying the air into the compressed air introduction means.

* * * * *